(12) United States Patent
Kobayashi (10) Patent No.: US 8,186,330 B2
(45) Date of Patent: May 29, 2012

(54) APPARATUS FOR ENGINE CONTROL (75) Inventor: Atsushi Kobayashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 12/995,525

(22) PCT Filed: May 26, 2009

(86) PCT No.: PCT/IB2009/005722
§ 371 (c)(1),
(2), (4) Date: Dec. 1, 2010

(87) PCT Pub. No.: WO2009/147488
PCT Pub. Date: Dec. 10, 2009

(65) Prior Publication Data
US 2011/0139119 A1  Jun. 16, 2011

(30) Foreign Application Priority Data

Jun. 4, 2008 (JP) .................................. 2008-146537
Mar. 30, 2009 (JP) ................................. 2009-080782

(51) Int. Cl.
*F02P 5/06* (2006.01)
(52) U.S. Cl. .............. 123/406.29; 123/559.1; 123/90.15

(58) Field of Classification Search ............... 123/559.1, 123/90.15, 406.23, 406.24, 406.29, 406.35, 123/345–348
See application file for complete search history.

(56) References Cited

FOREIGN PATENT DOCUMENTS

| JP | H09-209895 A | 8/1997 |
| JP | H10-318005 A | 12/1998 |
| JP | 2000-110528 A | 4/2000 |
| JP | 2006-307656 A | 11/2006 |

*Primary Examiner* — Hai Huynh
(74) *Attorney, Agent, or Firm* — Global IP Counselors, LLP (57) ABSTRACT

An engine control apparatus is provided with an engine, an ignition device, a valve timing changing mechanism, an intake valve close timing detecting device, a supercharger and a controller. The engine achieves a Miller cycle by the valve timing changing mechanism setting an intake valve close timing to occur after a bottom dead center timing. The controller controls an ignition timing of the ignition device, the open timing of the intake valve and the close timing of the intake valve. The controller retards the ignition timing during supercharging and when a detected value of the intake valve close timing is earlier than a target value of the intake valve close timing by at least a prescribed value in comparison with a situation in which the detected value matches the target value of the intake valve close timing.

11 Claims, 10 Drawing Sheets

APPARATUS FOR ENGINE CONTROL

CROSS-REFERENCE TO RELATED APPLICATIONS

This U.S. National stage application claims priority to Japanese Patent Application Nos. 2008-146537, filed on Jun. 4, 2008 and 2009-080782, filed on Mar. 30, 2009. The entire disclosures of Japanese Patent Application Nos. 2008-146537 and 2009-080782 are hereby incorporated herein by reference.

BACKGROUND

1. Field of the Invention

The present invention generally relates to an internal combustion engine that operates according to a late intake valve closing Miller cycle in which an intake valve close timing is set to occur after a bottom dead center.

2. Background Information

A valve timing changing mechanism capable of advancing or retarding an open close timing of an intake valve is widely known. One example of such technology is disclosed in Japanese Laid-Open Patent Publication No. H08-338295.

In view of the above, it will be apparent to those skilled in the art from this disclosure that there exists a need for an improved internal combustion engine. This invention addresses this need in the art as well as other needs, which will become apparent to those skilled in the art from this disclosure.

SUMMARY

It has been discovered that in a valve timing changing mechanism like that presented in Japanese Laid-Open Patent Publication No. H08-338295, when the intake valve timing (IVC) is later than a bottom dead center and an initial position of an open timing and an initial position of a close timing of the intake valve are retarded positions (e.g., when an initial position of an intake valve close timing is a most retarded position), an actuator is driven such that the open and close timings of the intake valve are changed from the initial positions to more advanced positions. If a drive device serving to drive the actuator in order to move the open and close timings of the intake valve to more advanced positions fails, then the open and close timings of the intake valve will return to more retarded positions such that an intake air quantity will decline and add to the knock suppressing effect of the Miller cycle, which acts to lower the effective compression ratio. As a result, the engine state will change to a safer region.

However, in a valve timing changing mechanism like that presented in Japanese Laid-Open Patent Publication No. H08-338295, when the intake valve timing (IVC) is later than a bottom dead center and an initial position of an open timing and an initial position of a close timing of the intake valve are advanced positions (e.g., when an initial position of an intake valve close timing is a most advanced position), an actuator is driven such that the open and close timings of the intake valve are changed from the initial positions to more retarded positions. Consequently, if the drive device serving to drive the actuator in order to move the open and close timings of the intake valve to more retarded positions fails, then the open and close timings of the intake valve will return to more advanced positions and cause the intake air quantity and effective compression ratio for a given throttle opening degree to increase. As a result, the required ignition timing will become excessively advanced with respect to the set ignition timing and there will be the possibility that knocking will occur and the engine will stop.

In accordance with one aspect, an engine control apparatus is provided that basically comprises an internal combustion engine, an ignition device, a valve timing changing mechanism, an intake valve close timing detecting device, a supercharger and a controller. The internal combustion engine achieves a Miller cycle by setting an intake valve close timing to occur after a bottom dead center timing. The ignition device ignites an air-fuel mixture inside a combustion chamber of the internal combustion engine. The valve timing changing mechanism includes an actuator that is driven to change an open timing and a close timing of an intake valve. The intake valve close timing detecting device detects a close timing of the intake valve. The supercharger supercharges intake air inducted into the internal combustion engine. The controller controls an ignition timing of the ignition device, the open timing of the intake valve and the close timing of the intake valve. The controller performs an ignition timing retardation control that retards the ignition timing when the supercharger is supercharging and a detected value of the intake valve close timing detected by the intake valve close timing detecting device is earlier than a target value of the intake valve close timing by at least a prescribed value in comparison with a situation in which the detected value of the intake valve close timing matches the target value of the intake valve close timing.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1A:
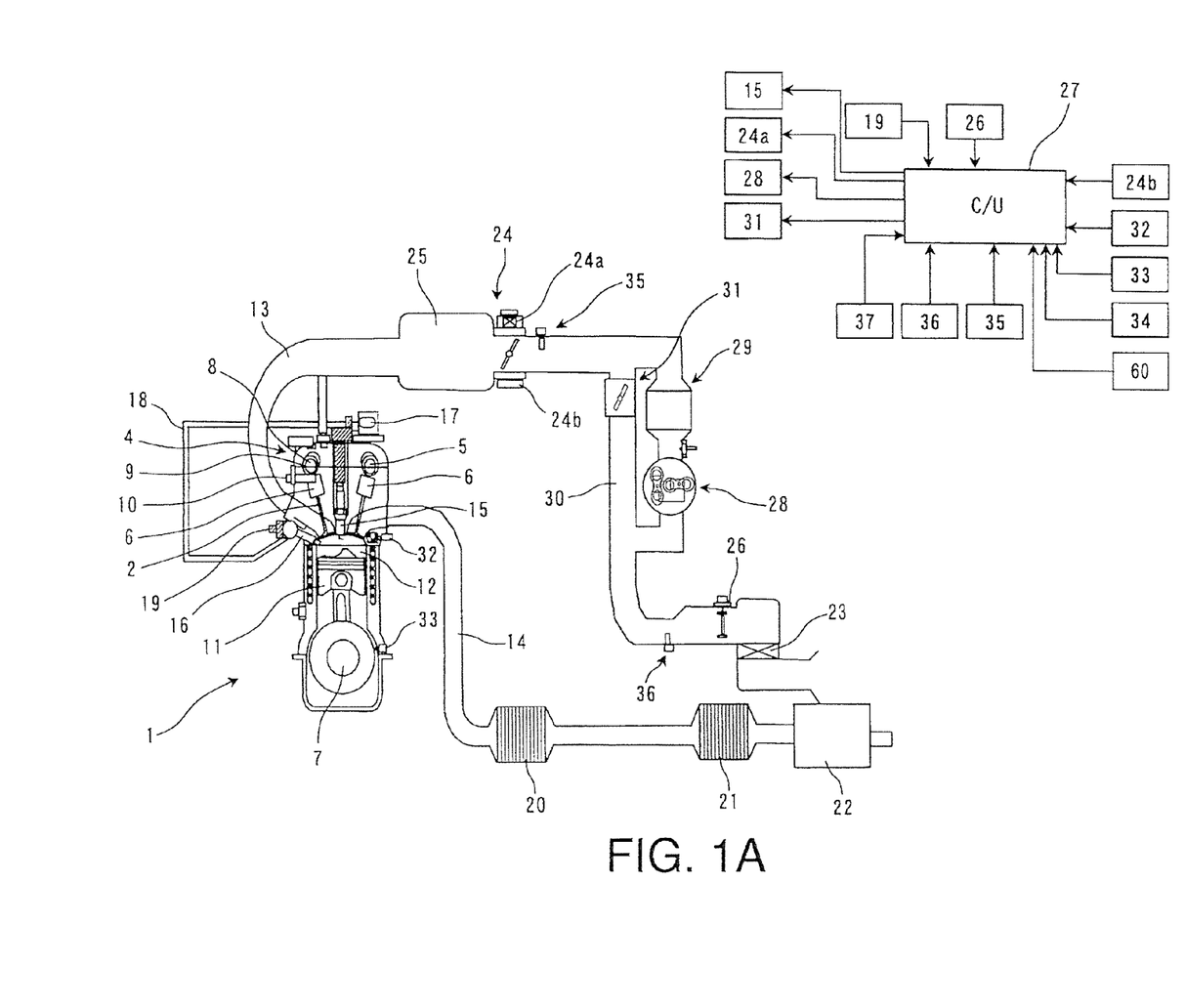
FIG. 1A is a system diagram of an internal combustion engine according to one embodiment.
Figure 1B:
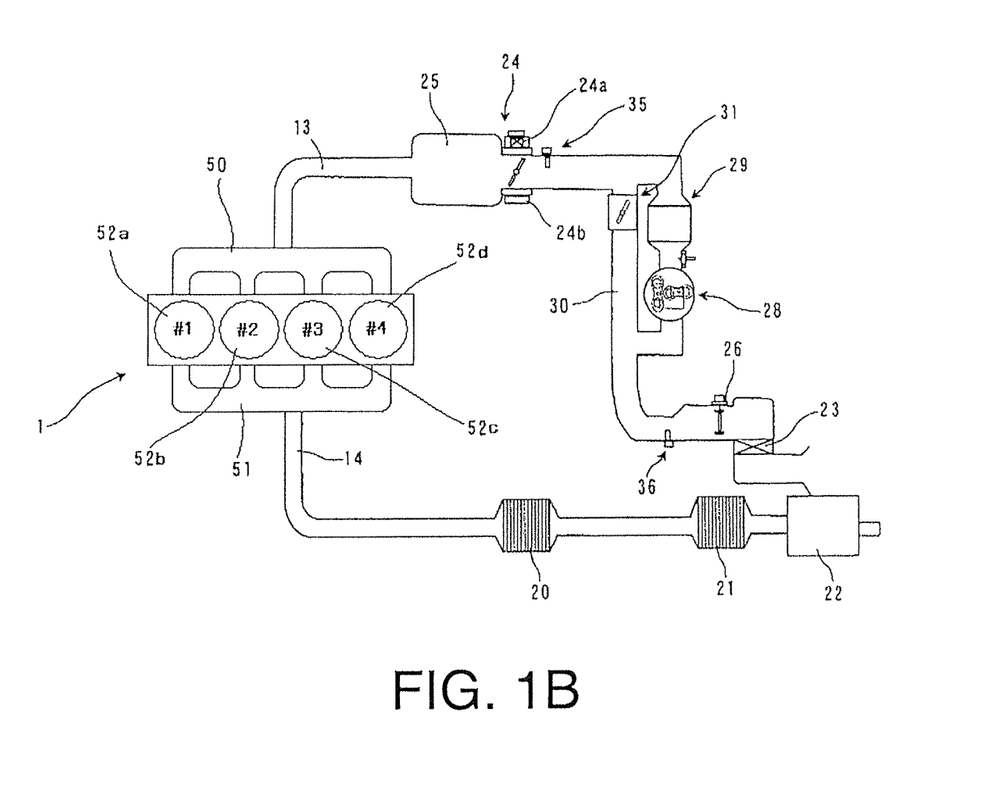
FIG. 1B is another system diagram of a 4-cylinder internal combustion engine according to one embodiment.

Referring initially to FIG. 1A and FIG. 1B, an internal combustion engine 1 is illustrated with an engine control apparatus in accordance with a first embodiment. The internal combustion engine 1 is a spark ignition gasoline engine in which a close timing of an intake valve 2 occurs after a bottom dead center. In other words, the internal combustion engine 1 operates according to a late intake valve closing Miller cycle. In this embodiment, for example, the internal combustion engine 1 is a 4-cylinder straight type engine. The 4-cylinder straight type engine has cylinders 52a (#1), 52b (#2), 53c(#3), 54d (#4). An order of the combustion is, for example, as follows: starts with #1, and then #3, #4 and #2.

If a drive device serving to drive an actuator that serves to move the open and close timings of the intake valve 2 of the engine 1 to more retarded timings fails, then the open and close timings of the intake valve return toward more advanced timings. In other words, an intake air quantity and an effective compression ratio of the engine both increase at a given throttle opening degree. As a result, a required ignition timing will become excessively advanced with respect to a set ignition timing and knocking will occur.

Against this kind of knocking, one might consider a method in which the failure of the valve timing changing mechanism is diagnosed and knocking is avoided. However, it takes time to detect if a failure of the valve timing changing mechanism has actually occurred. Thus, such a method cannot effectively prevent knocking. Also measuring the intake air quantity with an air flow meter and then reducing the opening degree of the throttle valve as an intake air quantity lowering measure is not an effective measure against such knocking because of the response delay that would occur before the intake air quantity decreased.

Also, when the drive device that drives the actuator fails, the response of the intake air in reaction to the response speed of the valve timing changing mechanism is faster than the response in a close proximity to the air flow meter. Consequently, if the ignition timing is corrected using the intake air quantity detected by the air flow meter, the correction will not be current enough to serve as a countermeasure against the knocking.

The internal combustion engine 1 typically has a plurality of combustion chambers 12 (only one shown in FIG. 1A), with each of the combustion chambers 12 of the internal combustion engine 1 including at least one intake valve 2, at least one exhaust valve 3. For the sake of simplicity, only one of the combustion chambers of the internal combustion engine 1 is illustrated in FIG. 1A. The other combustion chambers of the internal combustion engine 1 are similarly constructed. The internal combustion engine 1 further includes a valve timing changing mechanism 4 for controlling the opening and closing timings of each intake valve 2. In other words, as explained later, the valve timing changing mechanism 4 serves as a valve operating mechanism for the intake valve 2. The exhaust valve 3 is directly driven by an exhaust camshaft 5 and the valve lift characteristic of the exhaust valve 3 is constant (fixed).

A valve lifter 6 is arranged at an upper portion of the intake valve 2, and an intake camshaft 8 is arranged above the valve lifter 6. The intake camshaft 8 is oriented along a cylinder alignment direction and arranged to rotate about an axis in coordination with a crankshaft 7. An oscillating cam 9 is fitted onto the outside circumference of the intake camshaft 8 in positions corresponding to each of the intake valves 2. Each of the oscillating cams 9 presses against one of the valve lifters 6 and functions to open and close the corresponding intake valves 2 in opposition to a spring force of a valve spring (not shown).

The valve timing changing mechanism 4 retards and advances a lift center angle of the valve lift of the intake valves 2 in a continuous manner by driving an actuator. For example, the technology disclosed in Japanese Laid-Open Patent Publication No. 2001-336446 is one example of a displacement changing mechanism that can be used with the valve timing changing mechanism 4. An overview thereof will now be provided. The valve timing changing mechanism 4 is provided in a rotational power transmission path between the intake camshaft 8 and a cam pulley (not shown) that is provided on an outside circumference of the intake camshaft 8 and arranged to receive rotational power from the crankshaft 7 through a chain or a timing belt. The rotational phase between the intake camshaft 8 and the cam pulley is changed by driving the actuator (not shown). In this way, while the size of the operating angle (open duration) of the intake valve 2 is not changed, the center phase of the operating angle is varied in a continuous fashion within a prescribed range and held in any desired position.

Figure 2:
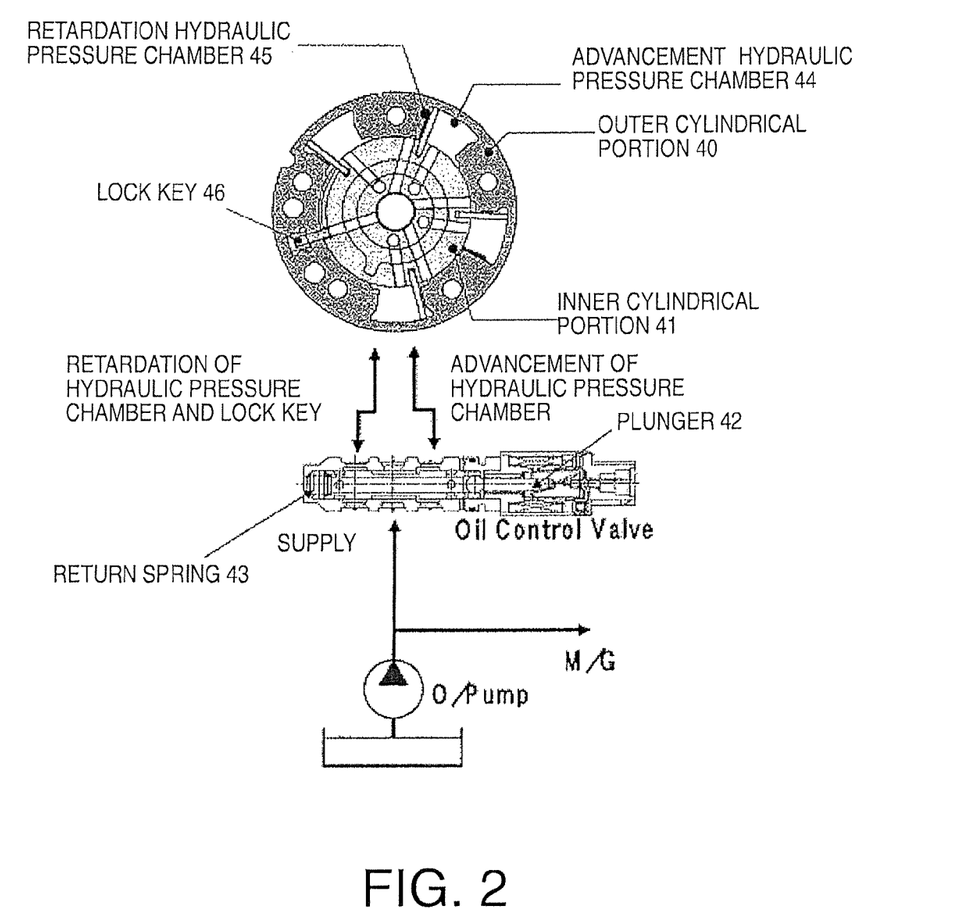
FIG. 2 is a schematic diagram of a valve timing changing mechanism.

FIG. 2 shows the main features of the valve timing changing mechanism 4, which will now be explained. The valve timing changing mechanism 4 basically includes an outer cylindrical portion 40, an inner cylindrical portion 41, a ring-shaped plunger 42 and a return spring 43. The outer cylindrical portion 40 is formed integrally on an inner circumferential portion of the cam pulley such that it rotates integrally with the cam pulley. The inner cylindrical portion 41 is fastened to the intake camshaft 8 such that it rotates integrally with the intake camshaft 8. The ring-shaped plunger 42 is disposed between the outer cylindrical portion 40 and the inner cylindrical portion 41. The ring-shaped plunger 42 serves as an actuator. The return spring 43 is configured and arranged to always apply a spring force against the plunger 42 in one direction.

An advancement hydraulic pressure chamber 44 and a retardation hydraulic pressure chamber 45 are provided so as to be partitioned from each other along a lengthwise direction of the plunger 42. A directional control valve 10 serves as a drive device to drive the plunger 42 (e.g., the actuator) and redirect a hydraulic oil pressure from the advancement hydraulic pressure chamber 44 to the retardation hydraulic pressure chamber 45 or vice versa. The plunger 42 moves along an axial direction of the outer and inner cylindrical portions 40 and 41. This axial movement is converted into relative rotational movement between the outer and inner cylindrical portions 40 and 41. The relative rotational phase between the outer and inner cylindrical portions 40 and 41 changes in a continuous fashion. More specifically, the axial movement of the plunger 42 is converted into relative rotation between the intake camshaft 8 and the cam pulley such that the relative rotational phase between the intake camshaft 8 and the cam pulley changes in a continuous fashion. The outer and inner cylindrical portions 40 and 41 are fitted one inside the other, and secured together with a lock key 46. The lock key 46 is provided in the outer cylindrical portion 40 with a spring or other elastic member being provided therebetween. The lock key 46 is provided inside an oil passage that communicates with the retardation hydraulic pressure chamber 45. When the outer and inner cylindrical portions 40 and 41 are connected together with the lock key 46 and hydraulic pressure acts toward the retardation hydraulic pressure chamber 45, the lock key 46 is pushed toward the outer cylindrical portion 40 by the hydraulic pressure and the connection between the outer cylindrical portion 40 and the inner cylindrical portion 41 is released.

The valve timing changing mechanism 4 according to this embodiment is configured such that when the directional control valve 10 (e.g., the drive device) that drives the plunger 42 (e.g., the actuator) fails, the intake valve close timing (IVC) moves to a most advanced position. More specifically, for example, if the drive device is the directional control valve 10 and a broken wire or poor electrical connection causes renders the directional control valve 10 uncontrollable, then a spool (not shown in the drawings) inside the directional control valve 10 moves to an initial position and, thereby, causes the hydraulic oil to be supplied to the advancement hydraulic pressure chamber.

Although in this embodiment the valve timing changing mechanism 4 is hydraulically driven, the valve timing changing mechanism 4 can also be an electromagnetically driven valve timing changing mechanism.

Figure 3:
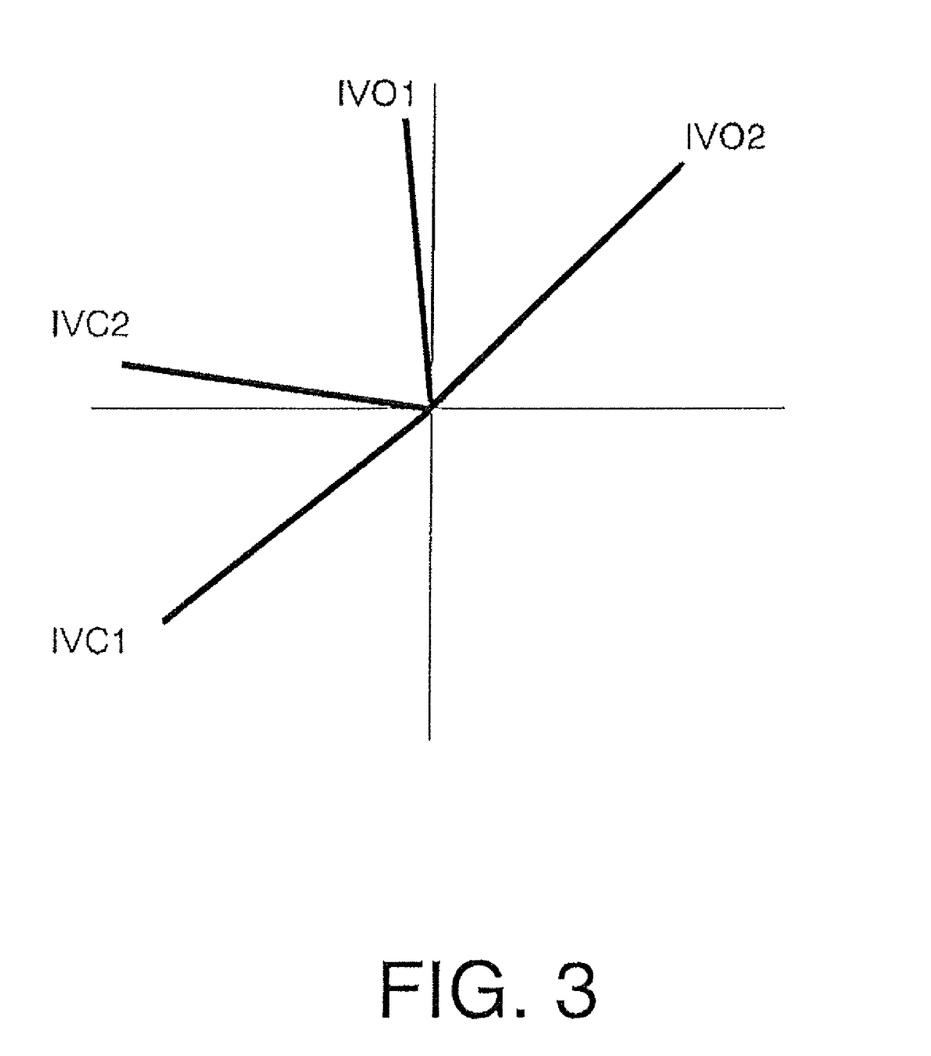
FIG. 3 is a diagram illustrating intake valve opening and closing timings of the internal combustion engine.

FIG. 3 depicts open and close timings of the intake valves that are changed by the valve timing changing mechanism 4. The intake valve close timing IVC1 is an initial position and the intake valve close timing IVC2 is a comparatively retarded timing adopted during full open driving (normal driving). The open timing (IVO1 and IVO2) of the intake valve also changes by the same phase amount as the close timing when the close timing changes.

An air intake passage 13 connects to the combustion chambers 12 formed by a piston 11 of the engine 1 through each intake valve 2, and an exhaust passage 14 connects to the combustion chambers 12 through each exhaust valve 3. A spark plug 15 is arranged in a top center portion of each of the combustion chambers 12. A fuel injection valve 16 is provided in each of the combustion chambers 12 to inject fuel directly into the combustion chambers 12. The fuel injection valve 16 is arranged in a side portion of the combustion chamber 12 on the same side as the intake valve 2. Fuel adjusted to a prescribed pressure by a high pressure fuel pump 17 and a pressure regulator (not shown) is supplied to the fuel injection valve 16 through a high pressure fuel passage 18. Thus, by opening the fuel injection valve 16 of each cylinder with a control pulse, a quantity of fuel corresponding to the open duration of the valve 16 can be injected. A fuel pressure sensor 19 is provided to detect a fuel pressure.

A catalytic converter 20, a second catalytic converter 21 and a muffler 22 are provided in the exhaust passage 14 in the order listed from upstream to downstream.

An air flow meter 26 is arranged in the intake passage 13 to detect a flow rate of intake air. An electronically controlled throttle valve 24 is arranged in the intake passage 13 in a position downstream of the air flow meter 26. The air flow meter 26 has an intake air temperature sensor installed therewithin. An intake air collector 25 is positioned downstream of the electronically controlled throttle valve 24, and an air cleaner 23 is positioned upstream of the air flow meter 26.

The electronically controlled throttle valve 24 has an actuator 24a with an electric motor. An opening degree of the electronically controlled throttle valve 24 is controlled with a control signal from a controller 27. The electronically controlled throttle valve 24 has an integral sensor 24b configured to detect an actual opening degree of the electronically controlled throttle valve 24. Preferably, the throttle valve opening degree is closed-loop controlled to a target opening degree based on a detection signal from the sensor 24b.

A supercharger 28 and an intercooler 29 are also arranged in the intake passage 13 between the electronically controlled throttle valve 24 and the air flow meter 23. The intercooler 29 is arranged downstream of the supercharger 28.

A bypass passage 30 is connected to the intake passage 13 to bypass the supercharger 28 and the intercooler 29. One end of the bypass passage 30 is connected to the intake passage 13 at a position downstream of the intercooler 29 and the other end is connected to the intake passage 13 at a position upstream of the supercharger 28. A bypass valve 31 is arranged in the bypass passage 30 to open and close the bypass passage 30. The bypass valve 31 has an actuator (not shown in the drawings) comprising an electric motor. The opening degree of the bypass valve 31 is controlled with the control signal from a controller 27.

The internal combustion engine 1 is further provided with a coolant sensor 32, a crank angle sensor 33 an accelerator position sensor 34, a supercharge pressure sensor 35, a pressure sensor 36, and a vehicle speed sensor 60. The coolant sensor 32 serves to detect an engine coolant temperature. The crank angle sensor 33 serves to detect an engine rotational speed and a crank angle position. The accelerator position sensor 34 serves to detect an accelerator position (depression amount) resulting from operation of an accelerator pedal by a driver. The supercharge pressure sensor 35 and the pressure sensor 36 are provided in the intake passage 13. The supercharge pressure sensor 35 is arranged in a position upstream of the electronically controlled throttle valve 24 and downstream of the intercooler 29. The pressure sensor 36 is arranged in a position upstream of the supercharger 28 and downstream of the air cleaner 23. The vehicle speed sensor 60 serves to detect a vehicle speed.

The fuel injection quantity, the fuel injection timing, and the ignition timing of the engine 1 are controlled by the controller 27. The controller 27 receives detection signals from the various sensors mentioned above. In accordance with engine operating conditions detected from received detection signals, the controller 27 controls an opening degree of the electronically controlled throttle valve 24, a fuel injection timing and fuel injection quantity of the fuel injection valves 16, an ignition timing of the spark plugs 15, a valve lift characteristic (change amount of the intake valve open and close timings) achieved by the valve timing changing mechanism 4, the operation of the supercharger 28, and an opening degree of the bypass valve 31. During normal operation, the controller 27 controls the ignition timing of the spark plugs 15 to a basic ignition timing set according to a map or the like based on a rotational speed and a load of the engine. For example, the controller 27 determines the load of the engine based on a vehicle speed and an accelerator position (depression amount) resulting from operation of the accelerator pedal by a driver. The controller 27 receives a signal from a cam angle sensor 37. The cam angle sensor 37 serves to detect a rotational angle of the intake camshaft 8 and detects an actual close timing of the intake valves 2 based on the signal from the cam angle sensor 37. Thus, the cam angle sensor 37 is one example of an intake valve close timing detecting device.

In a system using the internal combustion engine 1 like that just described, when the engine 1 is operating in a state requiring the supercharger 28 to be driven (i.e., in a "supercharging region") and, for example, the directional control valve 10 of the valve timing changing mechanism 4 fails and causes the open and close timings of the intake valves to shift to more advanced timings that are more advanced than a target value by at least a prescribed value, an ignition timing retardation control (explained in detail later) and a supercharge pressure limiting control (explained in detail later) are executed in parallel with each other.

Figure 4:
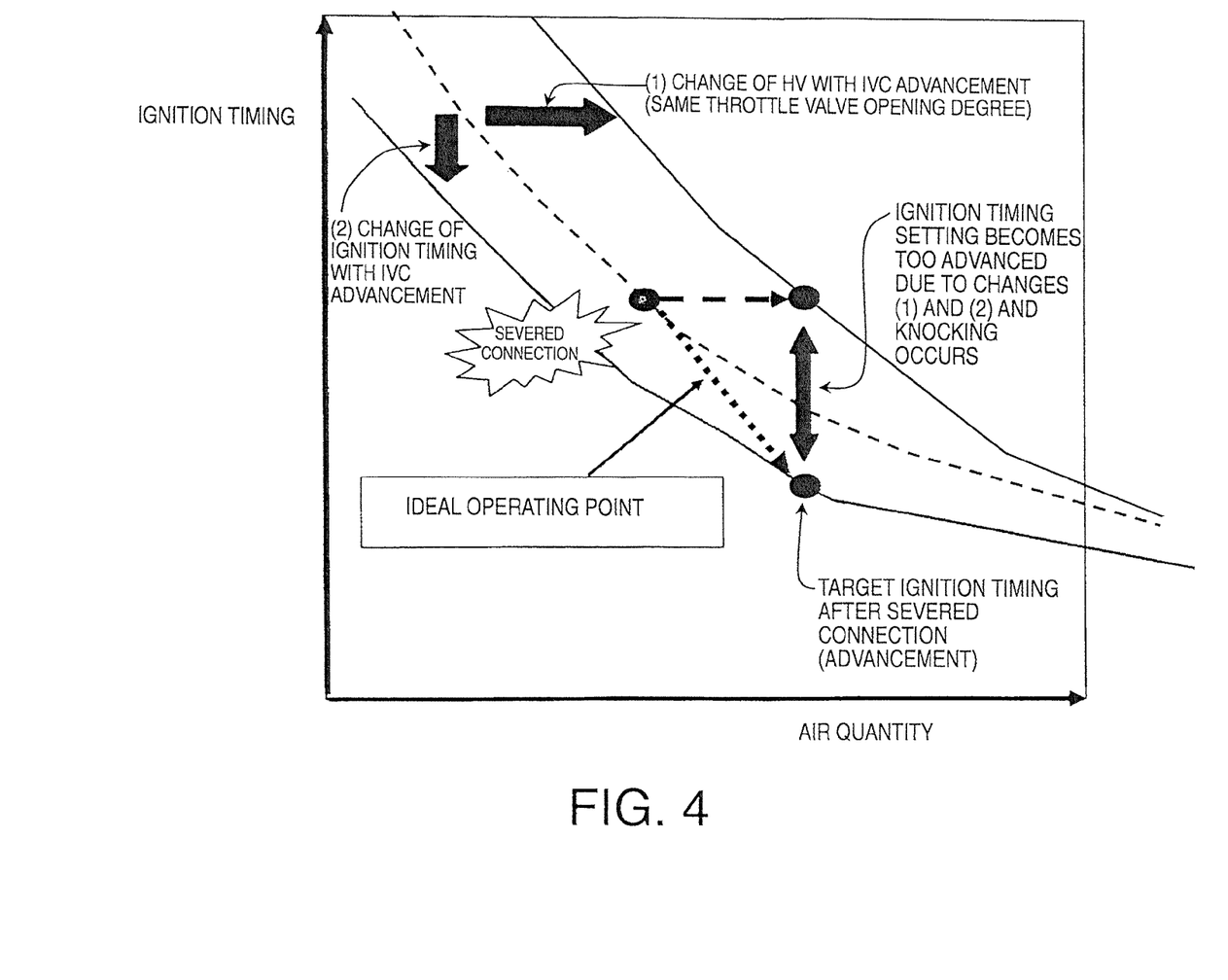
FIG. 4 is a diagram illustrating in a simple schematic fashion an ignition timing retardation control of the internal combustion engine.

FIG. 4 is a diagram illustrating in a simple schematic fashion how the target ignition timing changes when the directional control valve 10 of the valve timing changing mechanism 4 experiences a broken wire or severed connection.

Since the valve timing changing mechanism 4 is configured such that the initial position of the intake valve open timing is an advanced position, the intake valve close timing moves immediately to a most advanced position, i.e., the initial position, when a broken wire or severed connection occurs in the directional control valve 10 of the valve timing changing mechanism 4 while the intake valve open timing is retarded. In such a situation, the advanced position of the intake valve close timing causes the air quantity to increase regardless of the accelerator position and the target ignition timing changes to a more retarded position. Moreover, since the knock suppressing effect that would be obtained with a later intake valve close timing is diminished, the ignition timing required with respect to the same air quantity is even more retarded.

In this embodiment, the engine 1 uses the valve timing changing mechanism 4, in which an initial position (i.e., a position used when no control is being executed with the actuator) of the intake valve open timing is more advanced than the intake valve open timing used during normal operation after the engine 1 is warm. In a conventional apparatus having an engine and a supercharger similar to that of this embodiment, if a target compression ratio is set to a high compression ratio substantially equal to an anti-knock limit (i.e., a limit below which knocking does not occur), then knocking will occur in the engine if the valve timing changing mechanism fails and the intake valve close timing advances to a most advanced timing.

Generally, knocking can be prevented effectively by throttling (controlling the throttle valve opening) so as to restrict the intake air quantity or by retarding the ignition timing (setting it to a later timing). However, when a failure of the valve timing changing mechanism 4 causes the intake valve close timing to change immediately to a most advanced position, it is difficult to prevent knocking from occurring by throttling the intake air quantity because the intake air quantity changes with a slower response speed than the response speed at which the valve timing changing mechanism 4 changes the intake valve close timing.

Therefore, this embodiment is configured to monitor an amount by which a detected value of an actual intake valve close timing deviates toward a more advanced timing from a target value of the intake valve close timing (hereinafter called the "intake value close timing advancement amount") and to determine that the valve timing changing mechanism 4 could be failing if the intake valve close timing advancement amount becomes equal to or larger than a prescribed threshold value. When it has been determined that the valve timing changing mechanism 4 could be failing, the ignition timing is retarded starting from the next cylinder in the firing order so as to prevent knocking that could possibly occur if the intake valve close timing advances to a most advanced position due to a failure of the valve timing changing mechanism 4.

The detected value of the intake valve close timing actually drifts from the target value to some degree even when the valve timing changing mechanism 4 has not failed and is operating normally. If the ignition timing is also retarded when the intake valve close timing shifts to an advanced position due to normal drifting (variation) with respect to the target value, then the fuel efficiency of the engine 1 will be degraded. Therefore, an upper limit value is established with respect to how much the detected value of the intake valve close timing can drift in the advancement direction relative to the target value of the intake valve close timing and still be considered normal. Thus, when the intake valve close timing advancement amount (i.e., the amount by which a detected value of the actual intake valve close timing deviates toward a more advanced timing from a target value of the intake valve close timing) is equal to or larger than the prescribed threshold value (upper limit value), the apparatus determines that there is a possibility that a failure has occurred in the valve timing changing mechanism 4.

In this embodiment, the threshold value is defined to be an advancement amount (e.g., five degrees) of the intake valve close timing that would cause knocking to occur if a rotational speed of the engine 1 was at a lowest usable rotational speed (e.g., 1200 rpm) in a supercharging region where the supercharger is operated. In short, a reliable countermeasure against a failure of the valve timing changing mechanism 4 can be obtained by setting the threshold value to an operating condition where a knock sensitivity is highest, and a practical fuel efficiency can be ensured by allowing some degree of variation of the valve timing (deviation from the target value).

Figure 5:
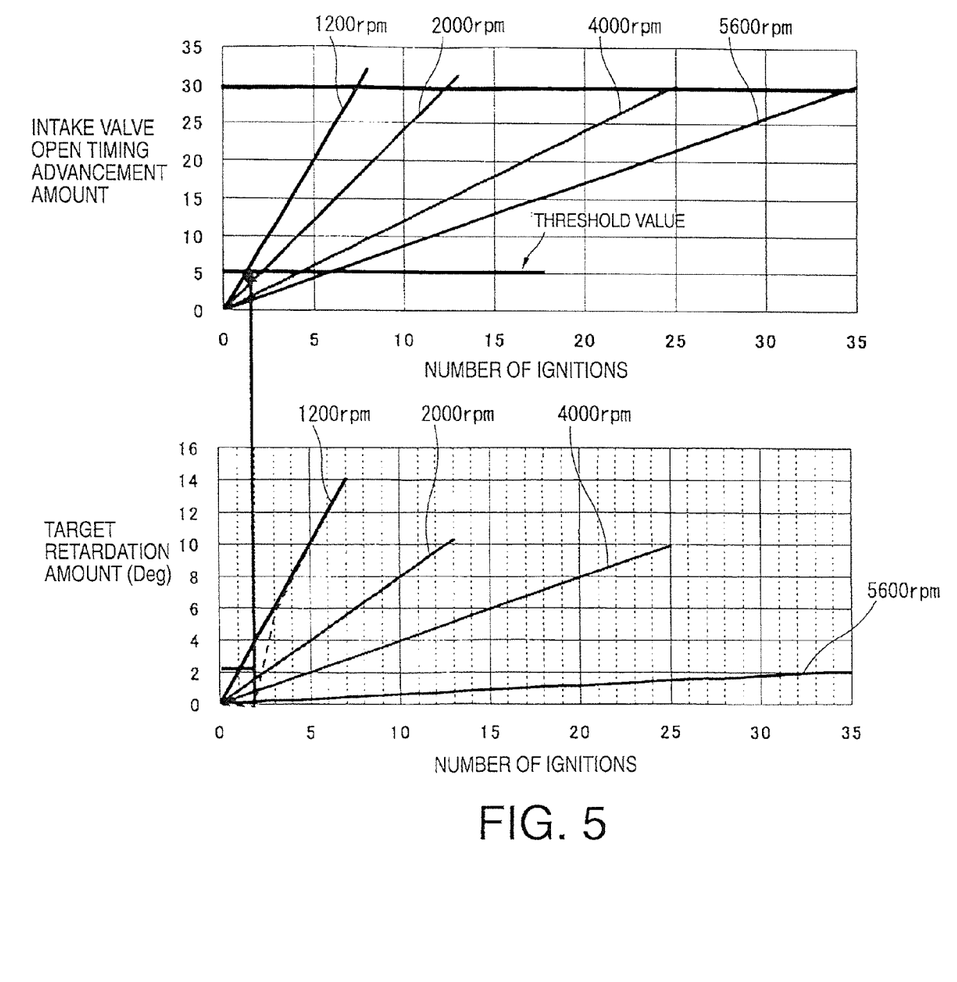
FIG. 5 is a pair of plots with an upper plot indicating a number of ignitions on a horizontal axis and an intake valve open timing advancement amount on a vertical axis, and a lower plot indicating a number of ignitions on a horizontal axis and a target retardation amount of an ignition timing resulting from advancement of the intake valve close timing with respect to a target intake valve close timing, with the number of explosions indicated in the plots being counted from a point in time when a broken wire or severed connection has occurred in a directional control valve of the valve timing changing mechanism.

FIG. 5 shows a first or upper plot indicating a number of ignitions on a horizontal axis and an intake valve open timing advancement amount on a vertical axis, and a second or lower plot indicating a number of ignitions on a horizontal axis and a target retardation amount of the ignition timing resulting from advancement of the intake valve close timing with respect to the target intake valve close timing. The number of ignitions indicated in the plots is counted from a point in time when a broken wire or severed connection has occurred in the directional control valve 10 of the valve timing changing mechanism 4. Since the linear characteristic differs depending on the rotational speed of the engine 1, FIG. 5 shows characteristic curves (lines) corresponding to the following engine speeds: 1200 rpm, 2000 rpm, 4000 rpm, and 5600 rpm.

As shown in FIG. 5, the intake valve close timing advancement amount and the target retardation amount for the ignition timing both increase with respect to a given number of ignitions as the engine speed decreases. Therefore, the embodiment can accommodate the entire supercharge region by detecting drifting of the intake valve close timing in the advancement direction and comparing to a prescribed value corresponding to an advancement amount (deviation in the advancement direction) up to an ignition timing that would cause knocking to occur if the engine 1 was operating at a lowest rotational speed (e.g., 1200 rpm) in the supercharging region. In other words, the controller 27 sets the prescribed value to a value corresponding to a difference between a target value ignition timing prior to ignition timing retardation control and a most retarded ignition timing at which knocking would occur if the internal combustion engine 1 was operating at a lowest engine rotational speed within an operating region of the internal combustion engine 1 where the supercharger 28 is operated.

Figure 6:
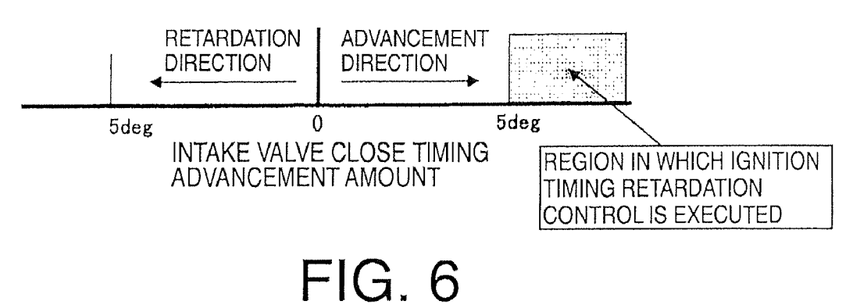
FIG. 6 is a diagram illustrating in a simple schematic fashion an execution region of an ignition timing retardation control of an internal combustion engine.

Since the determination of when to execute ignition timing retardation control focuses on the deviation of the detected value of the intake valve close timing from the target value in the advancement direction, the region in which the ignition timing retardation control is executed is as shown in FIG. 6. If the detected value of the intake valve close timing deviates from the target value in the advancement direction by five degrees or more, i.e., if the intake valve close timing advancement amount is five degrees or larger, then the apparatus determines that a failure could possibly have occurred in the directional control valve 10 of the valve timing changing mechanism 4 and executes an ignition timing retardation control.

When the ignition timing retardation control is executed, the retardation of the ignition timing starts from the cylinder (first cylinder) whose ignition occurs next after the cylinder where it was determined that the intake valve close timing advancement amount had become five degrees or larger. The target retardation amount to be applied to the ignition timing of the first cylinder is determined in a manner that takes into account an intake valve close timing advancement amount occurring at a cylinder where ignition occurred immediately prior to the first cylinder where the retardation control will first be started and an intake valve close timing advancement amount occurring during a period spanning from the ignition of the prior cylinder where ignition occurred immediately prior to the ignition of the first cylinder where retardation of the ignition timing will be started until the ignition of the first cylinder where retardation of the ignition timing will be started.

More specifically, as shown in FIG. 5, the retardation amount needed to compensate for advancement of the intake valve close timing basically increases at a constant rate starting from the first cylinder where the intake valve close timing advances toward a most advanced position due to a failure of the valve timing changing mechanism 4. However, in this embodiment, until the intake valve close timing advancement amount reaches or exceeds five degrees, retardation of the ignition timing is not executed even if a failure of the valve timing changing mechanism 4 causes the intake valve close timing to advance toward the most advanced position.

Therefore, in this embodiment, a total target retardation amount of the ignition timing corresponding to the amount the intake valve close timing has already advanced due to the failure of the valve timing changing mechanism 4 is calculated for the cylinder (first cylinder) where retardation of the ignition timing will first be started. Also a control profile (broken-line curve in FIG. 5) for the target retardation amount of the first cylinder where retardation of the ignition timing will first be started is matched to a characteristic curve of the retardation amount that starts from the point in time when the valve timing changing mechanism 4 has failed. Additionally, the ignition timing is quickly retarded to a desired ignition timing. Starting from the next cylinder (second cylinder) of the firing order after the cylinder (first cylinder) for which the ignition timing was first retarded, the retardation amount is determined in accordance with the rotational speed of the engine as shown in FIG. 5. Consequently, if, for example, the directional control valve 10 fails and the intake valve close timing advances toward an initial position by a prescribed amount or more, then the ignition timing can be retarded quickly to a desired ignition timing.

As shown in FIG. 5, the higher the engine rotational speed is, the smaller the target retardation amount is set. As a result, a rapid increase of an exhaust gas temperature caused by excessive retardation of the ignition timing can be prevented and the load imposed on the exhaust system can be decreased.

If the intake valve close timing advancement amount reaches or exceeds five degrees and then decreases, i.e., if the intake valve close timing advances by at least a prescribed value relative to the target value and then retards, then the advancement will be determined to be a temporary large deviation of the detected value of the intake valve close timing and the ignition timing will be corrected in accordance with the detected value of the intake valve close timing. In short, the ignition timing is retarded in accordance with a detected value of the intake valve close timing if the intake valve close timing advancement amount becomes equal to or larger than five degrees, but, afterwards, the ignition timing retardation control is ended if the intake valve close timing advancement amount becomes smaller than five degrees. As a result, excessive degradation of the fuel efficiency during practical use of the engine can be prevented when the detected value of the intake valve close timing deviates from the target value by a large amount.

As explained above, if the directional control valve 10 of the valve timing changing mechanism 4 suffers a severed connection while the engine 1 is operating in a supercharging region in which the supercharger 28 is driven and the intake valve close timing advances by at least a prescribed value (amount) from the target value, then the ignition timing is retarded in order to avoid knocking. However, there is a possibility that the retardation of the ignition timing could cause the exhaust gas temperature to increase beyond an allowable temperature of the exhaust system. Therefore, in this embodiment, when the ignition timing retardation control retards the ignition timing, a supercharge pressure limiting control is executed to adjusts an opening degree of the bypass valve 31. The supercharge pressure limiting control is started from the next cylinder (second cylinder) to undergo ignition after the cylinder (first cylinder) where the retardation of the ignition timing was first started. The supercharger pressure limiting control is configured to adjust the supercharge pressure to an upper limit supercharge pressure set in accordance with an intake valve close timing advancement amount.

Figure 7:
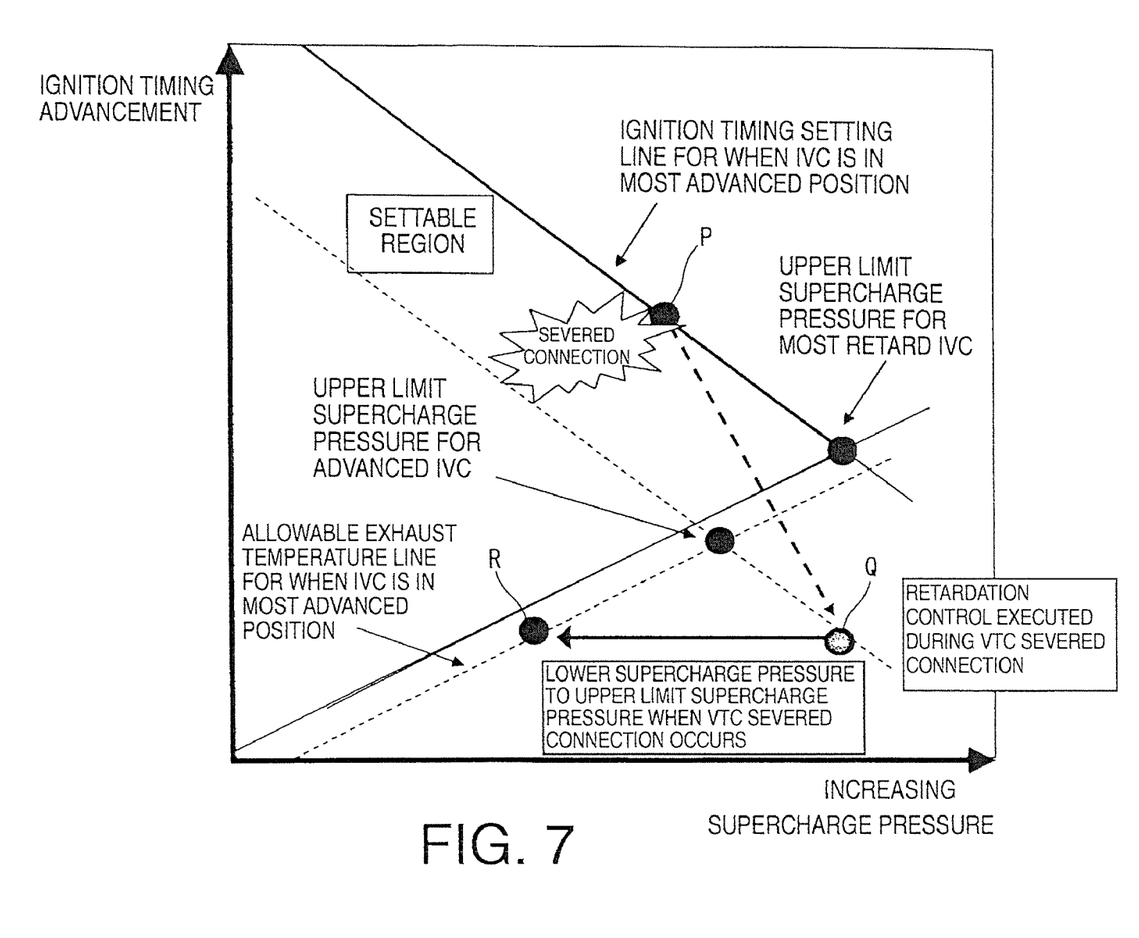
FIG. 7 is a diagram illustrating in a simple schematic fashion a supercharge pressure limitation control of an internal combustion engine.

The control will now be explained further with reference to FIG. 7. When a severed connection occurs in the directional control valve 10 of the valve timing changing mechanism 4 (point P) and the intake valve close timing advances, the ignition timing is retarded and the exhaust gas temperature will exceed the allowable exhaust gas temperature of the exhaust system (point Q) if no other measures are taken. Therefore, in addition to retarding the ignition timing, the supercharge pressure is decreased to an upper limit supercharge pressure set such that the exhaust gas temperature is substantially equal to the allowable exhaust gas temperature (point R). The upper limit supercharge pressure is set so as to achieve an intake air quantity with which the exhaust gas temperature remains equal to or lower than the allowable exhaust gas temperature even after the ignition timing retardation control is executed in accordance with the intake valve close timing advancement amount. More specifically, a table is prepared in advance which is used to set an upper limit supercharge pressure in accordance with the intake valve close timing occurring when the directional control valve 10 experiences the severed connection.

The supercharge pressure limiting control is executed when the intake valve close timing advances because the directional control valve 10 has failed due to a severed connection or the like and the ignition timing retardation control described above is being executed. The supercharge pressure limiting control enables a stagnation time of the high temperature exhaust gas resulting from the retardation of the ignition timing to be shortened, and thus shortening a response delay of the intake air. As a result, the exhaust system can be prevented from being damaged by an increase of the exhaust gas temperature.

When the intake valve close timing advances because the directional control valve 10 has failed due to a severed connection or the like and the ignition timing retardation control described above is being executed, it is not necessary to use the size of the exhaust gas temperature increase as a condition for setting the ignition timing. As a result, the ignition timing setting can be advanced in this system and degradation of the fuel efficiency can be prevented.

Additionally, since the supercharge pressure limiting control is synchronized with the ignition timing retardation control, the supercharge pressure limiting control is not executed until the intake valve close timing advancement amount becomes equal to or larger than the prescribed threshold value. As a result, since some degree of variation (deviation from the target value) of the intake valve close timing is allowed, the engine operating state can be prevented from being excessively affected by the supercharge pressure limitation and abrupt torque decreases can be prevented during practical use of the engine.

Both in cases where the intake valve close timing ultimately reaches the most advanced position of the valve timing changing mechanism 4 due to a severed connection or other failure of the directional control valve 10 and in cases where the intake valve close timing merely undergoes a large deviation, the supercharge pressure limitation control can prevent the exhaust gas temperature from exceeding the allowable exhaust gas temperature while the ignition timing is being retarded in accordance with the intake valve close timing advancement amount. As a result, thermal damage to the exhaust system caused by the valve timing changing mechanism 4 can be prevented even when the valve timing deviates for reasons other than a severed connection or other failure of the directional control valve 10.

Figure 8:
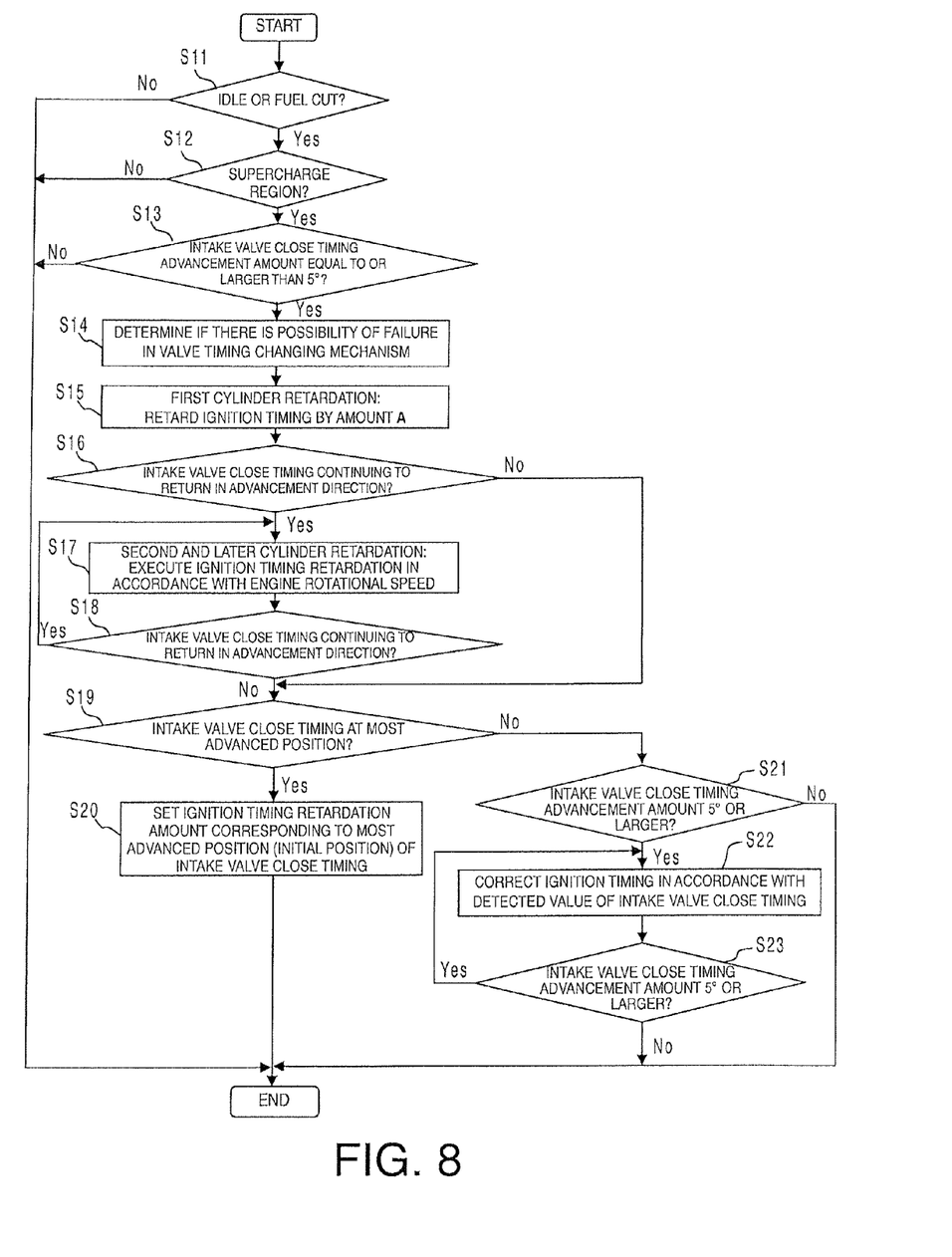
FIG. 8 is a flowchart depicting an ignition timing retardation control of an internal combustion engine.

FIG. 8 is a flowchart showing steps of an ignition timing retardation control according to this embodiment.

In step S11, the controller 27 determines if the engine 1 is in an idling state or a fuel cutting state. If the engine is idling or if the fuel is cut, the controller 27 proceeds to step S12. Otherwise, it ends the current cycle of the routine.

In step S12, the controller 27 determines if the engine 1 is operating in a supercharging region in which the supercharger 28 is driven. If the engine 1 is in the supercharging region, the controller 27 proceeds to step S13. Otherwise, it ends the current cycle of the routine.

In step S13, the controller 27 determines if a detected value of the actual intake valve close timing is more advanced than a target value of the intake valve close timing by five degrees or more, i.e., if the intake valve close timing advancement amount is five degrees or larger. If so, then the controller 27 proceeds to step S14. If not, then it ends the current cycle of the routine.

In step S14, the controller 27 determines if there is a possibility that a failure has occurred in the valve timing changing mechanism 4.

In step S15, the controller 27 retards the ignition timing of a cylinder (first cylinder) whose ignition occurs next in the firing order after the cylinder where it was determined that the intake valve close timing advancement amount had become five degrees or larger. The ignition timing is retarded by a target retardation amount (A) that is determined in a manner that takes into account an intake valve close timing advancement amount occurring up to a prior cylinder where ignition occurred immediately prior (i.e., the cylinder where it was determined that the intake valve close timing advancement amount had become five degrees or larger) and an intake valve close timing advancement amount occurring during a period from the cylinder where ignition occurred immediately prior up to the cylinder (first cylinder) at which retardation of the ignition timing will first be started.

In step S16, the controller 27 determines if the close timing of the intake valve 2 is continuing to return in the advancement direction. If so, then the controller 27 determines that there is still a possibility that a failure has occurred in the valve timing changing mechanism 4 and proceeds to step S17. If not, then the controller 27 proceeds to step S19.

In step S17, the controller 27 retards the ignition timing of the cylinder (second cylinder) whose ignition occurs next after the cylinder (first cylinder) where the ignition timing was first retarded. The target retardation amount is determined according to the engine rotational speed. The controller 27 then proceeds to step S18.

In step S18, the controller 27 determines if the close timing of the intake valve 2 is continuing to return in the advancement direction. If so, then the controller 27 determines that there is still a possibility that a failure has occurred in the valve timing changing mechanism 4 and proceeds to step S17. If not, then the controller 27 proceeds to step S19. That is, if the close timing of the intake valve 2 is continuing to return in the advancement direction after the intake valve close timing advancement amount has reached or exceeded five degrees, then the controller 27 will retard the ignition timing of cylinders whose ignitions occur after the cylinder (second cylinder) whose ignition occurred immediately after the cylinder (first cylinder) where the ignition timing was first retarded and the target retardation amount will be determined in accordance with the engine rotational speed.

In step S19, the controller 27 determines if the intake valve open timing is in the most advanced position, i.e., if the intake valve close timing is in the most advanced position. If the intake valve open timing is in the most advanced position, then the controller 27 proceeds to step S20. Otherwise, the controller 27 determines that the increase of the intake valve close timing advancement amount was merely a temporary variation and that the valve timing changing mechanism 4 has not failed. The controller 27 then proceeds to step S21.

In step S20, the controller 27 retards the ignition timing by an amount corresponding to the most advanced position (initial position) of the intake valve close timing and ends the current cycle of the routine.

In step S21, the controller 27 determines if a detected value of the actual intake valve close timing is more advanced than a target value of the intake valve close timing by five degrees or more, i.e., if the intake valve close timing advancement amount is five degrees or larger. If so, then the controller 27 proceeds to step S22. If not, then the controller 27 determines that it is no longer necessary to retard the ignition timing and ends the current cycle of the routine.

In step S22, the controller 27 revises the ignition timing in accordance with a detected value of the close timing of the intake valve 2. In other words, the controller 27 retards the ignition timing of the first cylinder to undergo ignition after the intake valve close timing stops returning in the advancement direction by an ignition timing retardation amount corresponding to an ignition timing advancement correction amount.

In step S23, the controller 27 determines if a detected value of the actual intake valve close timing is more advanced than a target value of the intake valve close timing by five degrees or more, i.e., if the intake valve close timing advancement amount is five degrees or larger. If so, then the controller 27 returns to step S22. If not, then the controller 27 determines that it is no longer necessary to retard the ignition timing and ends the current cycle of the routine. More specifically, if the intake valve close timing advancement amount became equal to or larger than five degrees due to a temporary variation, then the intake valve close timing will start to return to a more retarded timing. Until the intake valve close timing advancement amount becomes smaller than five degrees, the controller 27 retards the ignition timing by an ignition timing retardation amount corresponding to the ignition timing advancement correction amount.

Figure 9:
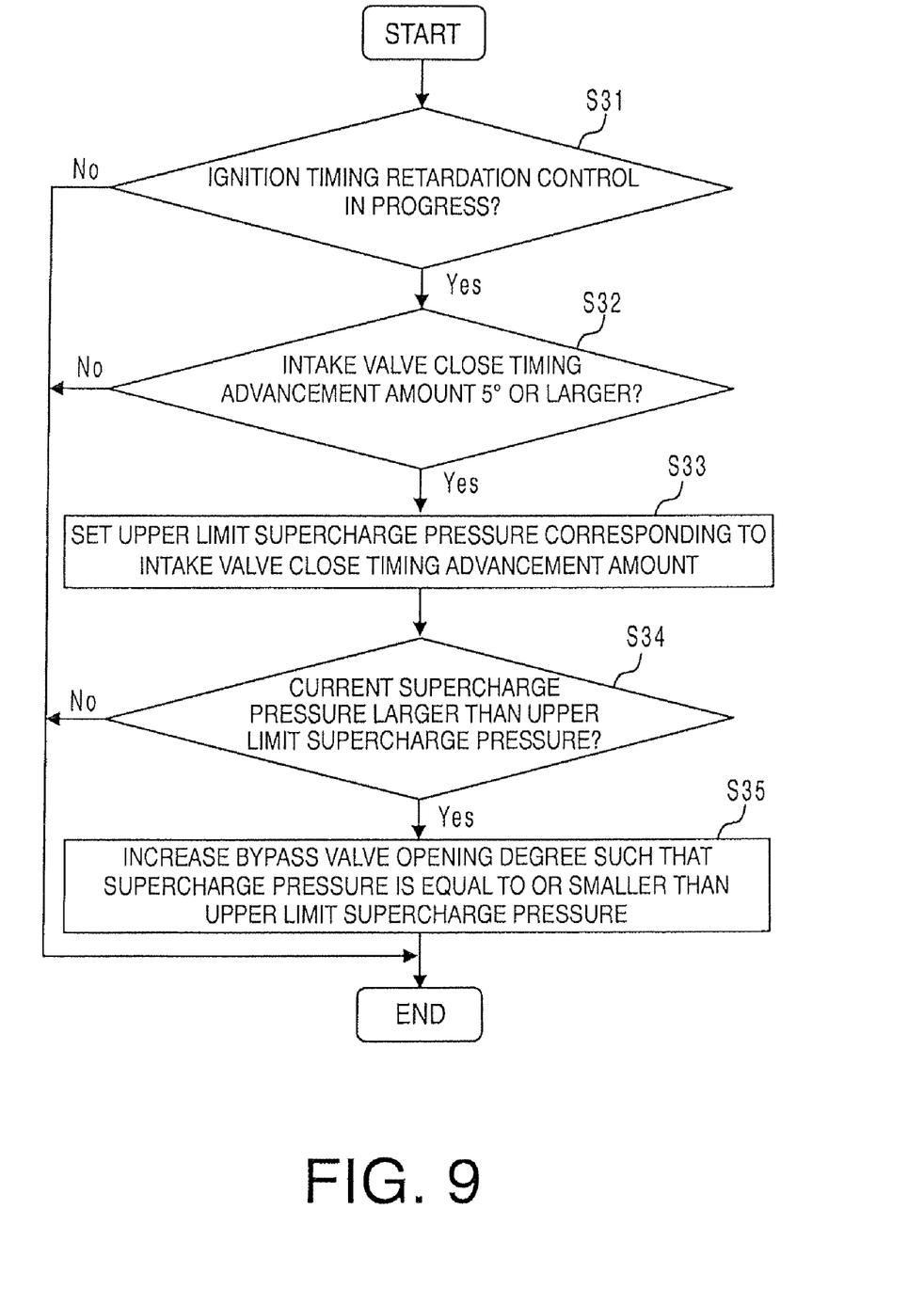
FIG. 9 is a flowchart depicting a supercharge pressure limiting control of an internal combustion engine.

FIG. 9 is a flowchart showing steps of a supercharge pressure limiting control according to this embodiment.

In step S31, the controller 27 determines if the ignition timing retardation control is in progress. If so, then the controller 27 proceeds to step S32. If not, then the controller 27 ends the current cycle of the routine.

In step S32, the controller 27 determines if the intake valve close timing advancement amount is equal to or larger than five degrees. If the intake valve close timing advancement amount is equal to or larger than five degrees, then the controller 27 proceeds to step S33. Otherwise, the controller 27 ends the current cycle of the routine.

In step S33, the controller 27 sets an upper limit supercharge pressure L in accordance with the intake valve close timing advancement amount.

In step S34, the controller 27 determines if a current supercharge pressure is larger than the upper limit supercharge pressure L set in step S33. If the current supercharge pressure is larger than the upper limit supercharge pressure L, then the controller 27 proceeds to step S35. Otherwise, the controller 27 ends the current cycle of the routine.

In step S35, the controller 27 adjusts an opening degree of the bypass valve 31 such that the supercharge pressure becomes equal to or smaller than the upper limit supercharge pressure L. More specifically, in step S35, the controller 27 increases the opening degree of the bypass valve 31 such that the supercharge pressure becomes equal to or smaller than the upper limit supercharge pressure L.

Although in the embodiment described above the target retardation amount is determined in accordance with the engine rotational speed, it is also possible to determine the target retardation amount in accordance with the engine rotational speed and the engine load of the engine. That is, the target retardation amount can be set such it decreases as the engine rotational speed increases, and decreases as the engine load increases. In this way, too, an abrupt increase in the exhaust gas temperature caused by excessive retardation can be prevented and the load imposed on the exhaust system can be reduced.

Although in the embodiment described above an intake air quantity with which the exhaust gas temperature does not exceed an allowable exhaust gas temperature is achieved by adjusting the opening degree of the bypass valve 31, it is also acceptable to configure the engine 1 to achieve an intake air quantity with which the exhaust gas temperature does not exceed an allowable exhaust gas temperature by adjusting the opening degree of either the electronically controlled throttle valve 24 or the bypass valve 31.

The technical concepts of the apparatus that can be achieved with the embodiment described above will now be explained along with the resulting effects thereof.

According to the illustrated embodiment, the apparatus is used in the internal combustion engine 1, which is configured to achieve a Miller cycle by setting an intake valve close timing to occur after a bottom dead center. The engine 1 includes the supercharger 28 that operates in accordance with an operating state of the engine, the valve timing change mechanism 4 that changes an open timing and a close timing of the intake valve by driving the actuator (e.g., the plunger 42), and an intake valve close timing detecting device (e.g., the cam angle sensor 37) that detects a close timing of the intake valve. When the engine 1 is operating in a supercharging region where the supercharger 28 is driven and a detected value of the intake valve close timing is more advanced than a target value of the intake valve close timing by at least a prescribed value, an ignition timing is retarded in comparison with a situation in which the detected value matches the target value. As a result, when an intake valve close timing returns toward an initial position that is more advanced than a target value, an ignition timing is retarded such that an occurrence of knocking can be prevented.

In the internal combustion engine 1 described above, the valve timing change mechanism is configured to set the intake valve close timing to a most advanced position when a drive device (e.g., the directional control valve 10) serving to drive the actuator (e.g., the plunger 42), undergoes a failure. As a result, knocking can be prevented when a failure stops the drive device that drives the actuator (e.g., the plunger 42), from operating and the intake valve close timing returns toward a most advanced position, i.e., initial position.

In the internal combustion engine 1 described above, the prescribed value corresponds to an advancement amount of the intake valve close timing that would cause knocking to occur if an internal combustion engine rotational speed was at a lowest usable rotational speed in the supercharging region. As a result, a reliable countermeasure against a failure of the valve timing changing mechanism 4 can be obtained by setting the prescribed value to a position where a knock sensitivity is highest, and a practical fuel efficiency can be ensured by allowing some degree of variation of the valve timing (deviation from the target value).

In the internal combustion engine 1 described above, retardation of the ignition timing is applied to a first cylinder whose ignition will occur next after a source cylinder where the intake valve close timing was detected to be advanced by the prescribed value or more; a target retardation amount of the ignition timing is determined in accordance with an internal combustion engine rotational speed and an amount by which a detected value of the intake valve close timing is advanced in comparison to a target value of the intake valve close timing; and a target retardation amount of the first cylinder at which retardation of the ignition timing is to be started is determined in a manner that takes into account an intake valve close timing advancement amount occurring up to a cylinder where ignition occurred immediately prior and an intake valve close timing advancement amount occurring during a period from the cylinder where ignition occurred immediately prior to the first cylinder at which retardation of the ignition timing is to be started. As a result, the ignition timing can be retarded quickly to a desired ignition timing when the intake valve close timing advances toward an initial value by at least prescribed value due to a failure of the drive device that drives the actuator.

In the internal combustion engine 1 described above, a target retardation amount of an ignition timing of cylinders whose ignition occurs after the first cylinder at which retardation of the ignition timing was started is determined in accordance with a rotational speed and a load of the internal combustion engine. As a result, a rapid increase of an exhaust gas temperature caused by excessive retardation of the ignition timing can be prevented and the load imposed on the exhaust system can be decreased.

In the internal combustion engine 1 described above, the target retardation amount of the ignition timing is set to be smaller when the internal combustion engine rotational speed is higher. As a result, a rapid increase of an exhaust gas temperature caused by excessive retardation of the ignition timing can be prevented and the load imposed on the exhaust system can be decreased.

In the internal combustion engine 1 described above, the target retardation amount of the ignition timing is set to be smaller when the engine load is larger. As a result, a rapid increase of an exhaust gas temperature caused by excessive retardation of the ignition timing can be prevented and the load imposed on the exhaust system can be decreased.

In the internal combustion engine 1 described above, if the intake valve close timing starts returning to a more retarded value after retardation of the ignition timing has started, then the ignition timing is corrected in accordance with a detected value of the intake valve close timing. As a result, excessive degradation of the fuel efficiency during practical use of the engine can be prevented when the intake valve close timing deviates from the target value by a large amount.

In the internal combustion engine 1 described above, an upper limit supercharge pressure is set in accordance with a detected value of the intake valve close timing at a first cylinder at which retardation of the ignition timing is to be started and a supercharge pressure of the supercharger is controlled so as not to exceed the upper limit supercharge pressure. As a result, a stagnation time of the high-temperature exhaust gas resulting from the retardation of the ignition timing can be shortened, thus shortening a response delay of the intake air and enabling the exhaust system to be prevented from being damaged by high-temperature exhaust gas.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An apparatus comprising:
an internal combustion engine that achieves a Miller cycle by setting an intake valve close timing to occur after a bottom dead center timing;
an ignition device that ignites an air-fuel mixture inside a combustion chamber of the internal combustion engine,
a valve timing changing mechanism including an actuator that is driven to change an open timing and a close timing of an intake valve,
an intake valve close timing detecting device that detects a close timing of the intake valve;
a supercharger that supercharges intake air inducted into the internal combustion engine;
a controller that controls an ignition timing of the ignition device, the open timing of the intake valve and the close timing of the intake valve,
the controller performing an ignition timing retardation control that retards the ignition timing when the supercharger is supercharging and a detected value of the intake valve close timing detected by the intake valve close timing detecting device is earlier than a target value of the intake valve close timing by at least a prescribed value in comparison with a situation in which the detected value of the intake valve close timing matches the target value of the intake valve close timing, and
the controller setting the prescribed value to a value corresponding to a difference between a target value ignition timing prior to ignition timing retardation control and a most retarded ignition timing at which knocking would occur upon determining the internal combustion engine was operating at a lowest engine rotational speed within an operating region of the internal combustion engine where the supercharger is operated.

2. The apparatus as set forth in claim 1, wherein
the valve timing changing mechanism advances the intake valve close timing when the actuator fails as compared to a target intake valve close timing for when the actuator is operating normally.

3. The apparatus as set forth in claim 1, wherein
during the ignition timing retardation control, the controller retards the ignition timing of a first cylinder whose ignition occurs in a firing order immediately after a source cylinder where the detected value of the intake valve close timing was earlier than the target value of the intake valve close timing by at least the prescribed value.

4. The apparatus as set forth in claim 3, wherein
the controller calculates an intake valve close timing advancement amount that is an amount by which the target value of the intake valve close timing differs from the detected value of the intake valve close timing; and
the controller sets the ignition timing in accordance with a rotational speed of the internal combustion engine and the intake valve close timing advancement amount.

5. The apparatus as set forth in claim 4, wherein
the controller determines the ignition timing of the first cylinder where the ignition timing will be retarded based on:
the intake valve close timing of the source cylinder where ignition occurred immediately prior to the ignition of the first cylinder, and
a change amount by which the intake valve close timing will change during a period spanning from when the ignition occurred at the source cylinder to when ignition occurs at the first cylinder.

6. The apparatus as set forth in claim 5, wherein
the controller determines an ignition timing of a second cylinder where ignition occurs next in a firing order after the first cylinder where retardation of the ignition timing was started in accordance with an engine rotational speed and an engine load of the internal combustion engine.

7. The apparatus as set forth in claim 4, wherein
the controller sets a target retardation amount of the ignition timing to be earlier when an engine rotational speed of the internal combustion engine is higher, and
the controller sets a target retardation amount of the ignition timing to be earlier when an engine load of the internal combustion engine is larger.

8. The apparatus as set forth in claim 4, wherein
the controller set the ignition timing based on a target retardation amount, which corresponds to a difference between an ignition timing for when the detected value of the intake valve close timing matches the target value of the intake valve close timing and an ignition timing to be obtained by retarding the ignition timing;
the controller sets the target retardation amount of the ignition timing to become smaller as an engine rotational speed of the internal combustion engine becomes higher; and
the controller sets the target retardation amount of the ignition timing to become smaller when an engine load of the internal combustion engine becomes larger.

9. The apparatus as set forth in claim 1, wherein
the controller sets the ignition timing in accordance with the detected value of the intake valve close timing upon determining the intake valve close timing has started to return to a more retarded value after the controller has started retardation of the ignition timing.

10. The apparatus as set forth in claim 1, wherein
the controller sets an upper limit supercharge pressure for the supercharger in accordance with the detected value of the intake valve close timing; and
the controller controls a supercharge pressure of the supercharge pressure such that the supercharge pressure does not exceed the upper limit supercharge pressure when the controller is retarding the ignition timing.

11. An engine control method comprising:
operating an internal combustion engine to achieve a Miller cycle by controlling an actuator of a valve timing changing mechanism to change an open timing and a close timing of an intake valve such that the intake valve close timing to occur after a bottom dead center timing;
selectively supercharging intake air inducted into the internal combustion engine;
retarding the ignition timing during supercharging and when a detected value of the intake valve close timing is earlier than a target value of the intake valve close timing by at least a prescribed value in comparison with a situation in which the detected value of the intake valve close timing matches the target value of the intake valve close timing; and
setting the prescribed value to a value corresponding to a difference between a target value ignition timing prior to ignition timing retardation control and a most retarded ignition timing at which knocking would occur upon determining the internal combustion engine was operating at a lowest engine rotational speed within an operating region of the internal combustion engine where the supercharger is operated.

* * * * *